United States Patent [19]

Linder et al.

[11] Patent Number: 4,977,616

[45] Date of Patent: Dec. 11, 1990

[54] ANTENNA SELECTION CONTROL CIRCUIT

[75] Inventors: Donald L. Linder; Steve H. Goode, both of Palatine; Henry L. Kazecki, Des Plaines; Donald W. Dennis, Schaumburg; James C. Baker, Hanover Park, all of Ill.

[73] Assignee: Motorola, Inc., Schaumburg, Ill.

[21] Appl. No.: 428,429

[22] Filed: Oct. 26, 1989

Related U.S. Application Data

[63] Continuation of Ser. No. 126,548, Nov. 30, 1987, abandoned.

[51] Int. Cl.⁵ .................... H04B 7/08; H04B 7/212
[52] U.S. Cl. .................................................. 455/277
[58] Field of Search .......................... 455/132–134, 455/135, 33, 52, 277; 370/29

[56] References Cited

U.S. PATENT DOCUMENTS 4,513,412  8/1988  Cox ..................................... 455/134

FOREIGN PATENT DOCUMENTS 0039649  2/1986  Japan ................................... 455/277

Primary Examiner—Benedict V. Safourek
Assistant Examiner—Ralph Smith
Attorney, Agent, or Firm—Steven G. Parmelee

[57] ABSTRACT

An antenna switch control circuit for use in achieving antenna selection diversity in TDM RF receivers. RSSI for at least one antenna is monitored during time slots containing information not of interest. This information can then be compared with other antenna performance information to allow a selection to be made such that the receiver generally operates with the antenna receiving the strongest signal. In one embodiment, all possible antennas are monitored during a time slot containing information not of interest. In another embodiment, RSSI for the selected antenna can be monitored during the time slot of interest, such that antenna selection can again be varied should the selected antenna diminish in performance.

14 Claims, 3 Drawing Sheets

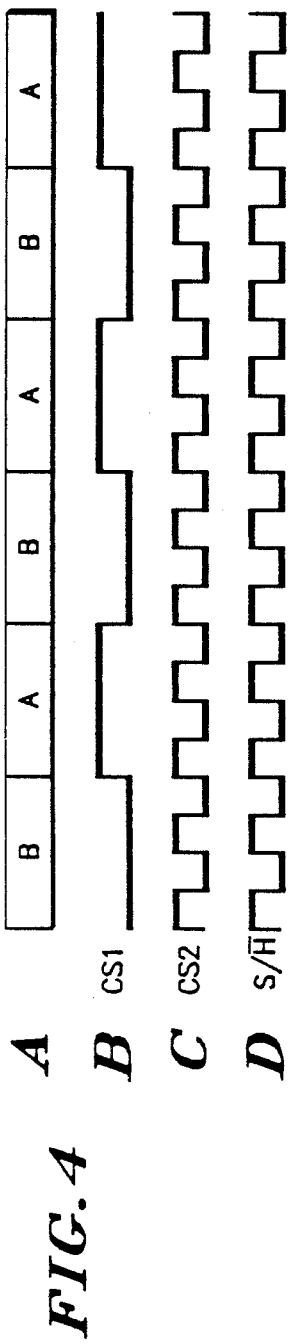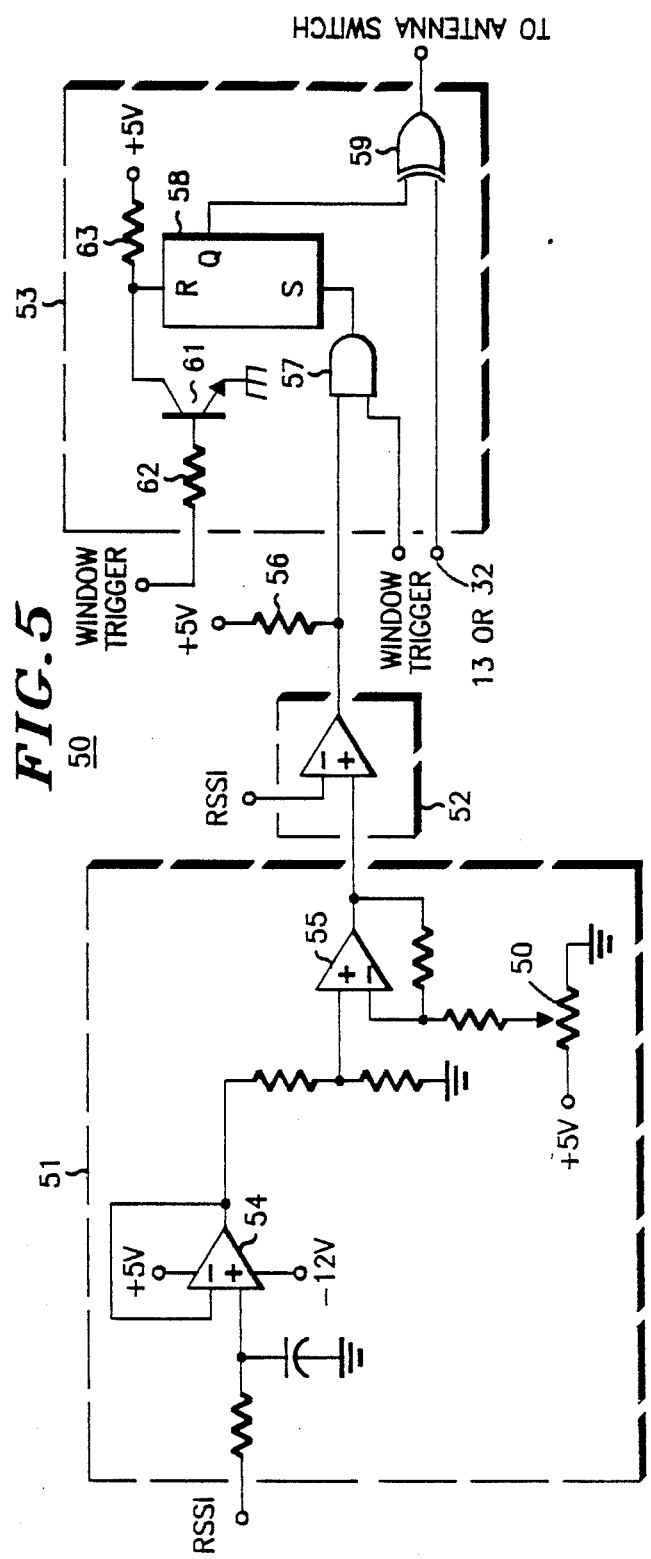

ANTENNA SELECTION CONTROL CIRCUIT

This is a continuation of application Ser. No. 07/126,548, filed Nov. 30, 1987 and now abandoned.

BACKGROUND ART

Radio receivers that make use of antenna selection diversity are known in the art. In general, such a receiver makes use of a default antenna, and only makes use of the alternate antenna when the signal being received by the default antenna diminishes below an acceptable threshold (the threshold may either be a preselected constant or a value that fluctuates somewhat and represents, for example, an average value of the default antenna received signal). The criteria for measuring antenna performance may be, for example, a received signal strength indicator (RSSI).

Time division multiplexed (TDM) RF communications systems are also known in the art. Such systems divide information to be broadcast into packets, which packets are then broadcast in predetermined time slots. A typical TDM system establishes a short time frame (for example, a few milliseconds) made up of two or more time slots, wherein the basic time frame format repeats continuously. A typical receiver will monitor, decode, and process further as appropriate information contained in time slots of interest, and receive but ignore information contained in other time slots. (Additional information regarding TDM RF systems can be found in U.S. Ser. No. 843,882 and Ser. No. 843,961, both as filed on Mar. 25, 1986 and both incorporated herein by this reference.)

A need exists to accommodate antenna selection diversity in a TDM RF receiver.

SUMMARY OF THE INVENTION

This invention includes circuitry for developing signals related to received signal quality, such as signal strength, for at least two antennas associated with a TDM receiver, wherein these signals are developed for at least one of the antennas during a TDM time slot not of interest. The circuit then compares these developed signals to identify which of the antennas receives the stronger signal, and causes the receiver to use that identified antenna.

In one embodiment, all of the antennas associated with the receiver are sampled during a time slot not of interest, such that the antenna selection occurs prior to receipt of a time slot of interest.

In another embodiment, the circuitry continues to monitor received signal strength for the selected antenna during the time slot of interest, such that if the received signal strength diminishes unacceptably, the receiver can be caused to utilize an alternative antenna during the time slot of interest.

BRIEF DESCRIPTION OF THE DRAWINGS

FIG. 4 comprises a timing diagram associated with the second embodiment;

FIG. 5 comprises a schematic diagram of additional circuitry that can be utilized with either embodiment.

BEST MODE FOR CARRYING OUT THE INVENTION

Figure 1:
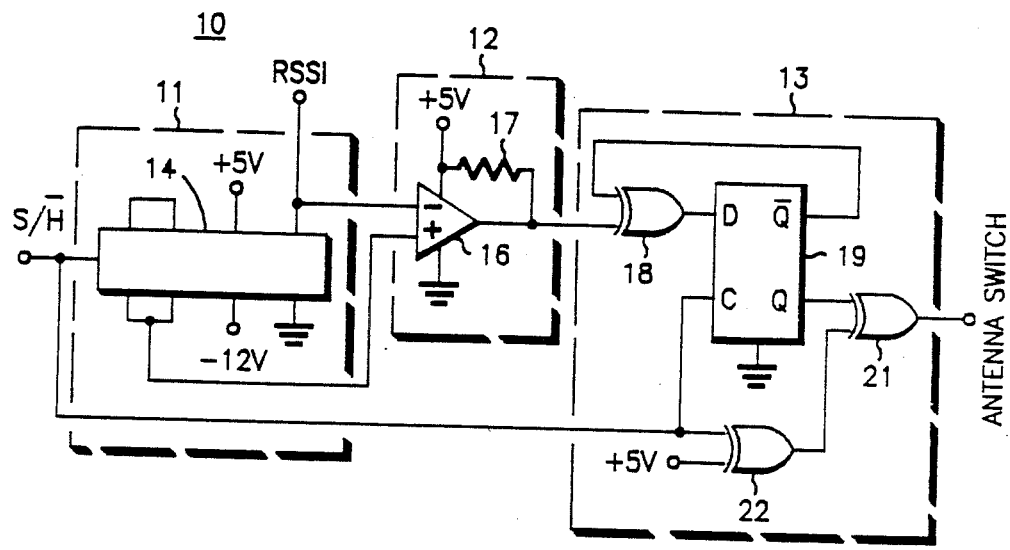
FIG. 1 comprises a schematic diagram of a first embodiment of the invention.

Referring now to FIG. 1, the first embodiment can be seen as depicted generally by the numeral 10. This first embodiment includes generally a sample and hold circuit (11), a comparator (12), and an antenna switch control circuit (13).

Figure 6:
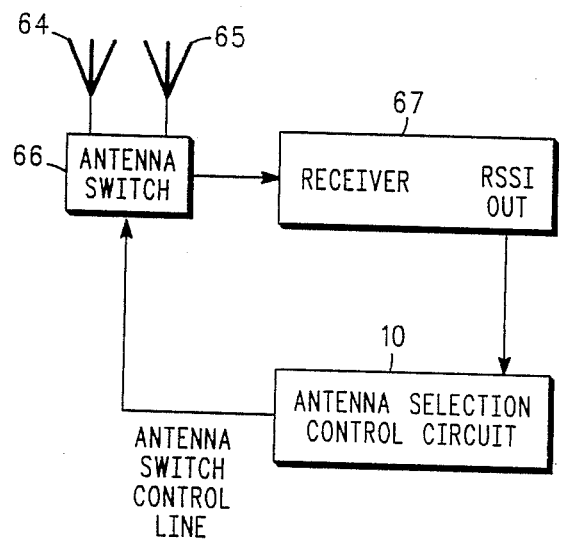
FIG. 6 comprises a block diagram depiction of a radio that uses the invention.

Referring to FIG. 6, the antenna selection control circuit (10) of the invention operates in conjunction with a receiver (67), an antenna switch (66), and at least two antennas (64 and 65). Signals received by one or the other antenna (64 and 65) are provided to he receiver (67) for appropriate processing. An RSSI value for the received signal is developed in a known manner and provided to the antenna selection control circuit (10). The antenna selection control circuit (10), in a manner described below in more detail, then provides an antenna switch control line signal to the antenna switch (66) to control which antenna (64 and 65) is operably coupled to the receiver (67).

The sample and hold circuit (11) includes a sample and hold device (14) such as an AD585. The sample and hold control port connects to receive an appropriate sample and hold control signal (S/not H) as described in more detail below. The signal input port connects to receive an RSSI signal. The output ports connect to the comparator (12) as described below.

The comparator (12) can be comprised of a device such as the MC3302 (16). The non-inverting input to this device connects to receive the output of the sample and hold device (14). The inverting input connects to receive an RSSI signal. The output of the device (16) connects to a 1K ohm pull-up resistor (17) and also to one input of a first exclusive OR gate (18) that constitutes one input to the antenna switch control circuit (13).

The output of the first exclusive OR gate (18) connects to the data port of a flip-flop (19). The not Q output of the flip-flop (19) connects to the remaining input of the first exclusive OR gate (18). The Q output of the flip-flop (19) connects to one input of a second exclusive OR gate (21), the remaining input of which connects to the output of a third exclusive OR gate (22). One input of the latter connects to a positive 5 volt source and the remaining input connects to receive the S/not H signal, which produces an inverted S/not H signal, which signal also connects to the clock port of the flip-flop (19). The output of the second exclusive OR gate (21) constitutes the antenna switch output of the antenna switch control circuit (13).

Figure 2:
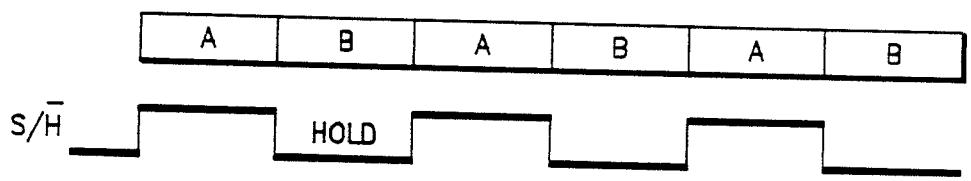
FIG. 2 comprises a timing diagram associated with the first embodiment.

Referring to FIG. 2a, a series of TDM time slots A and B can be seen, wherein slot A contains information of interest and slot B contains information not of interest to the receiver in question. FIG. 2b depicts the S/not H signal that would correspond to this arrangement. In particular, the S/not H signal as used in the first embodiment depicted in FIG. 1 would cause the sample and hold circuit (11) to sample RSSI for an antenna during a time slot containing information of interest. A comparison could then be carried out during time slots having information not of interest with respect to the antenna actually being used. A determination could then be made as to which antenna should be used for subsequent time slots containing information of interest.

Figure 3:
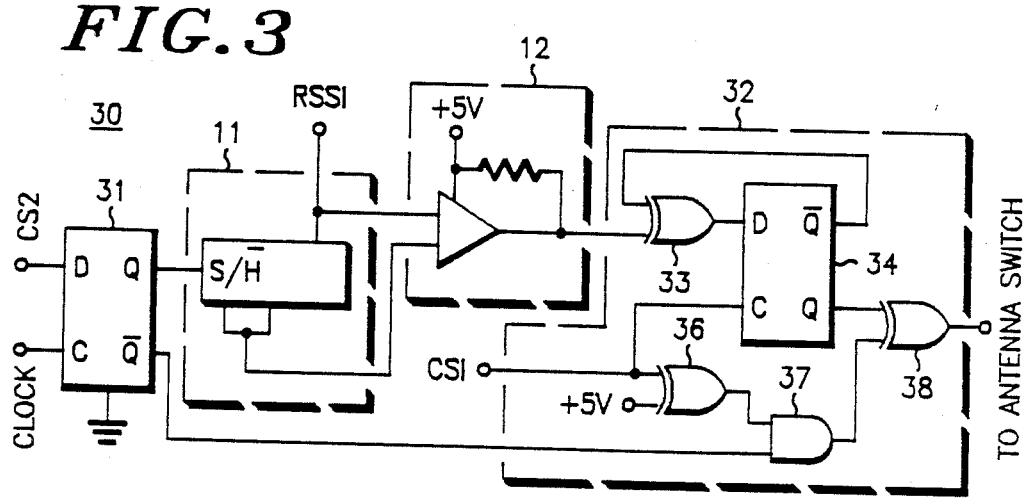
FIG. 3 comprises a schematic diagram of a second embodiment of the invention.

Referring now to FIG. 3, an alternative embodiment can be seen as depicted generally by the numeral 30. This embodiment includes a sample and hold circuit (11) and a comparator (12) essentially as described above. Therefore, these particular sections will not be described again.

The second embodiment (30) also includes a MC14013 flip-flop (31) having its data port connected to receive a CS2 signal as described below in more detail. The clock port connects to receive an appropriate clock signal as well understood in the art. The clock rate should of course be chosen to accommodate the time slot and frame length durations of the TDM system in question. The Q output of the flip-flop (31), which provides a delayed version of the CS2 signal, connects to the S/not H port of the sample and hold circuit (11). The not Q output of the flip-flop (31) connects to the antenna switch control circuit (32) as described below in more detail.

The antenna switch control circuit (32) includes a first exclusive OR gate (33) having one input connected to receive the output of the comparator (12) and another connected to receive the not Q output of a data type flip-flop (34) associated therewith. The flip-flop (34) has its data port connected to receive the output of the first exclusive OR gate (33). The clock port of this flip-flop (34) connects to receive a CSI signal as described below in more detail. This CSI signal is also provided to one input of a second exclusive OR gate (36), the remaining input of which connects to a positive 5 volt source. The output of this exclusive OR gate (36) connects to one input of an AND gate (37), the remaining input of which connects to the not Q output of the first flip-flop (31) referred to above. The output of this AND gate (37) and the Q output of the second flip-flop (34) connect to both inputs of a third exclusive OR gate (38), the output of which connects to an appropriate antenna switch as well understood in the art.

Referring now to FIG. 4a, a series of TDM time slots A and B can again be seen. An appropriate CSI and CS2 control signal to be used in the second embodiment (30) are depicted in FIGS. 4b and 4c. An S/not H control signal that results through provision of these control signals, in conjunction with an appropriate clock signal, is depicted in FIG. 4d.

By controlling the timing of the second embodiment (30) as depicted in FIG. 4, the second embodiment (30) will function to sample and compare RSSI values for both antennas during time slots that are not of interest, such that the decision regarding antenna selection can be made prior to receipt of a time slot of interest. With this approach, an improvement can be realized in a Rayleigh fading field with higher Doppler frequency where the time between antenna samples and the desired information slot is short.

Referring now to FIG. 5, an additional circuit which can be used in combination with either embodiment (10 or 30) can be seen as depicted generally by the numeral 50. This circuit (50) functions to allow the antenna in use during a time slot of interest to be monitored and compared against a historically determined value of antenna performance. If instantaneous antenna performance degrades sufficiently, this circuit (50) causes the receiver to switch antennas.

The circuit (50) depicted includes a reference signal unit (51), a comparator (52), and an antenna switch control circuit (53).

The reference signal circuit (51) receives an RSSI signal for the antenna in use and, through use of the operational amplifiers (54 and 55) and the 10K ohm resistors and capacitor depicted, develops an average value for the RSSI signal with respect to time. The variable resistor (50) connects to an appropriate 5 volt source, and serves to set the level below mean at which the circuit forces a switch to the alternative antenna. The output of this reference signal unit (51) connects to the noninverting input of a comparator (52), the inverting input of which connects to receive an instantaneous value representative of RSSI. The output of the comparator then connects to a 1K ohm pull-up resistor (56) and to one input of an AND gate (57) that constitutes the input to the antenna switch control circuit (53). The remaining input to the AND gate (57) connects to receive a window trigger signal, which essentially comprises the S/not H signal wherein the leading edge is delayed by 0.5 milliseconds to accommodate transients and to allow the circuitry to reach steady state conditions (when using the embodiment depicted in FIG. 3, the window trigger signal can be comprised of the CS1 signal to achieve substantially the same effect). The output of the AND gate (57) connects to the set port of a flip-flop (58), the Q output of which connects to one input of an exclusive OR gate (59), the remaining input of which connects to the antenna switch output of the antenna switch control circuit in either embodiment (13 or 32). The output of this exclusive OR gate (59) functions to provide a signal that can cause an appropriate antenna switch to switch antennas.

The reset port of the flip-flop (58) referred to above also connects to an appropriate reset circuit that includes a transistor (61) having a base connected through an 18K ohm resistor (62) to receive the window trigger signal referred to above. The emitter of this transistor connects to ground and the collector connects both to the reset port of the flip-flop (58) and through a 4.7K ohm resistor (63) to a positive 5 volt source. The reset signal forces the antenna switch to be controlled by the antenna switch control circuit (13 or 32) when the system receives a slot not of interest. When receiving the slot of interest, the antenna can be forced to switch to the alternative antenna by the flip-flop (58) based on the comparator (52).

We claim:

1. An antenna selection control circuit for use with a TDM RF receiver having at least two antennas for receiving an information signal, which information signal is comprised of time slots of interest that contain information of interest to the receiver and other time slots that contain information not of interest to the receiver, comprising:

(A) first means for developing signals related to received signal quality for at least two of said antennas, wherein said signal is developed for at least one of said antennas during a time slot that contains information not of interest to the receiver;

(B) second means responsive to said first means for comparing said developed signals to identify which of said at least two antennas received a signal of higher quality;

(C) third means responsive to said second means for causing said receiver to use said identified antenna during a subsequent time slot that contains information of interest to the receiver.

2. The antenna selection control circuit of claim 1 wherein said first means develops said signals for at least two of said antennas during a time slot that contain information not of interest.

3. The antenna selection control circuit of claim 1 wherein said signal quality comprises signal strength.

4. An antenna selection control circuit for use with a TDM RF receiver having at least two antennas for receiving an information signal, which information signal is comprised of time slots that contain information of interest to the receiver and other time slots that contain information not of interest to the receiver, comprising:
(A) first means for developing signals related to received signal quality for at least two of said antennas during a time slot that contains information not of interest to the receiver;
(B) second means responsive to said first means for comparing said developed signals to identify which of said at least two antennas received a signal of higher quality;
(C) third means responsive to said second means for causing said receiver to use said identified antenna during a subsequent time slot that contains information of interest to the receiver.

5. The antenna selection control circuit of claim 4 wherein said signal quality comprises signal strength.

6. The antenna selection control circuit of claim 4 wherein said first means includes sample and hold means for sampling, during a first TDM time slot prior to a TDM time slot that contains information of interest, a first signal related to received signal quality from a selected one of said antennas and for providing an output signal related to said sampled signal.

7. The antenna selection control circuit of claim 4 and further including:
(A) fourth means for comparing, during said next subsequent time slot that contains information of interest to the receiver, a reference signal with a signal related to received signal quality for said selected antenna, and for providing a comparison output signal related to said comparison; and
(B) antenna switch control means for responding to said fourth means output signal by causing said receiver to select a different one of said antennas for receiving said signal when said signal related to received signal quality for said selected antenna is less than said reference signal during said time slot that contains information of interest to the receiver.

8. The antenna selection control circuit of claim 7 wherein said reference signal is related to a mean value of received signal quality for said selected antenna during said time slot that contains information of interest.

9. An antenna selection control circuit for use with a TDM RF receiver having at least two antennas for receiving an information signal, comprising:
(A) sample and hold means for sampling, during a first TDM time slot prior to a TDM time slot that contains information of interest to the receiver, a first signal related to received signal strength from a selected one of said antennas and for providing an output signal related to said sampled signal;
(B) comparator means responsive to said sample and hold means for comparing, during said first TDM time slot, said output signal from said sample and hold means with a second signal related to received signal strength from a different selected one of said antennas, and for providing a comparator output signal related to which of said antennas has received a stronger signal; and
(C) antenna switch control means for responding to said comparator output signal by selecting which of said antennas is used by said receiver to receive the information signal in said TDM time slot that contains information of interest to the receiver.

10. The antenna selection control circuit of claim 9 and further including:
(D) reference signal means for providing a reference signal related to a mean value of received signal strength for said selected antenna during said TDM time slot that contains information of interest to the receiver;
(E) second comparator means responsive to said reference signal means for comparing, during said TDM time slot that contains information of interest to the receiver, said reference signal with a signal related to received signal strength for said selected antenna, and for providing a second comparator means output signal related to said comparison;
(F) second antenna switch control means for responding to said second comparator means output signal by causing said receiver to select a different one of said antennas for receiving said signal when said signal related to received signal strength for said selected antenna is less than said reference signal during said TDM time slot that contains information of interest to the receiver.

11. A method of selecting an antenna for a TDM RF receiver having at least two antennas for receiving a signal of interest, which signal is comprised of time slots that contain information of interest to the receiver and other time slots that contain information not of interest to the receiver, said method comprising the steps of:
during a time slot that contains information not of interest to the receiver and preceding a time slot that contains information of interest to the receiver;
(A) sampling and holding a signal related to received signal quality for one of said antennas;
(B) comparing said sampled and held signal with a second signal related to received signal quality for a second one of said antennas;
(C) selecting, based upon said comparison, one of said antennas to be used to receive said signal of interest in a next occurring time slot that contains information of interest to the receiver.

12. The method of claim 11 and including the additional steps of:
during a time slot that contains information of interest to the receiver that occurs subsequent to said time slot that contains information not of interest to the receiver:
(D) monitoring a signal related to received signal quality for said selected antenna;
(E) comparing said monitored signal with a reference signal;
(F) in response to said comparison between said monitored signal and said reference signal, deciding whether to select a different antenna.

13. The method of claim 12 wherein said reference signal is related to a mean value of received signal quality for said selected antenna during said time slot that contains information of interest.

14. The method of claim 13 wherein in step F, a decision is made to select a different antenna when said monitored signal is less than 10 dB below said reference signal.

* * * * *